(12) United States Patent
Parkinson et al.

(10) Patent No.: US 7,249,783 B2
(45) Date of Patent: Jul. 31, 2007

(54) AIRBAG TETHER RELEASE

(75) Inventors: David W. Parkinson, North Ogden, UT (US); Earl H. Nelson, Ogden, UT (US); Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 63 days.

(21) Appl. No.: 11/087,476

(22) Filed: Mar. 23, 2005

(65) Prior Publication Data

US 2006/0214406 A1  Sep. 28, 2006

(51) Int. Cl.
*B60R 21/16* (2006.01)

(52) U.S. Cl. .................... 280/743.2; 280/736
(58) Field of Classification Search ........... 280/736, 280/734, 735, 743.2, 742
See application file for complete search history.

(56) References Cited

U.S. PATENT DOCUMENTS

| | | | | |
|---|---|---|---|---|
| 5,887,894 A | * | 3/1999 | Castagner et al. | 280/743.2 |
| 6,076,854 A | * | 6/2000 | Schenck et al. | 280/743.2 |
| 6,299,203 B1 | * | 10/2001 | Muller | 280/736 |
| 6,454,300 B1 | | 9/2002 | Dunkle et al. | 280/742 |
| 6,513,835 B2 | * | 2/2003 | Thomas | 280/743.2 |
| 6,581,964 B2 | * | 6/2003 | Braunschadel | 280/743.2 |
| 6,616,184 B2 | * | 9/2003 | Fischer | 280/743.2 |
| 6,918,614 B2 | * | 7/2005 | Ryan | 280/743.2 |
| 7,021,657 B2 | * | 4/2006 | Kassman et al. | 280/743.2 |
| 2004/0046376 A1 | | 3/2004 | Ryan | 280/743.2 |
| 2005/0057027 A1 | * | 3/2005 | Fogle et al. | 280/739 |
| 2005/0057030 A1 | * | 3/2005 | Fischer et al. | 280/743.2 |
| 2005/0161922 A1 | * | 7/2005 | Bilbrey et al. | 280/736 |

* cited by examiner

*Primary Examiner*—Ruth Ilan
(74) *Attorney, Agent, or Firm*—Sally J Brown; Stoel Rives LLP

(57) ABSTRACT

Disclosed are embodiments of methods and apparatus for inflating an airbag with a tether release system. In one embodiment of the invention, first and second inflators are employed. A tether is operatively connected with one of the inflators such that the system is configured to release the tether upon deployment of one of the inflators and to allow the tether to restrict the full inflation size of the airbag upon deployment of the other inflator.

20 Claims, 5 Drawing Sheets

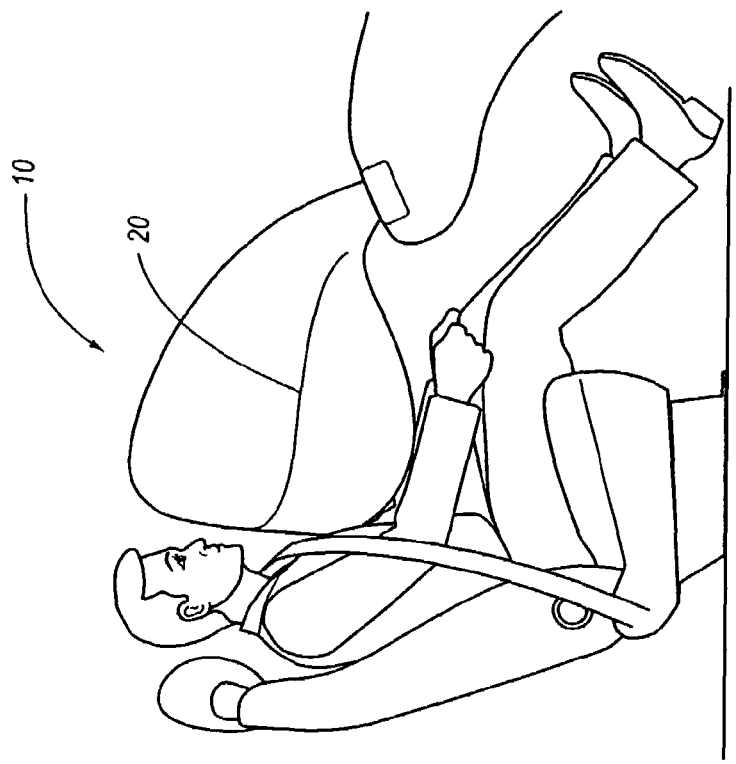
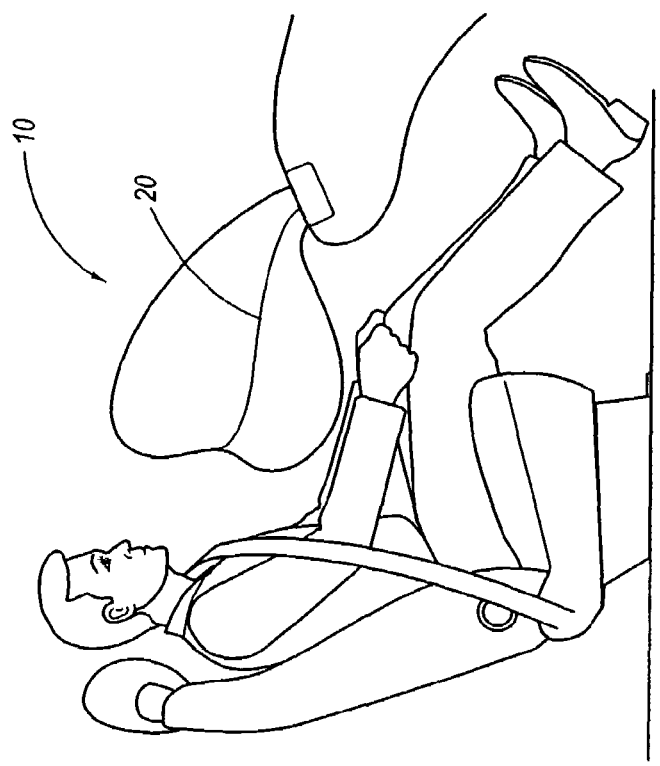
Fig. 1A
Fig. 1B

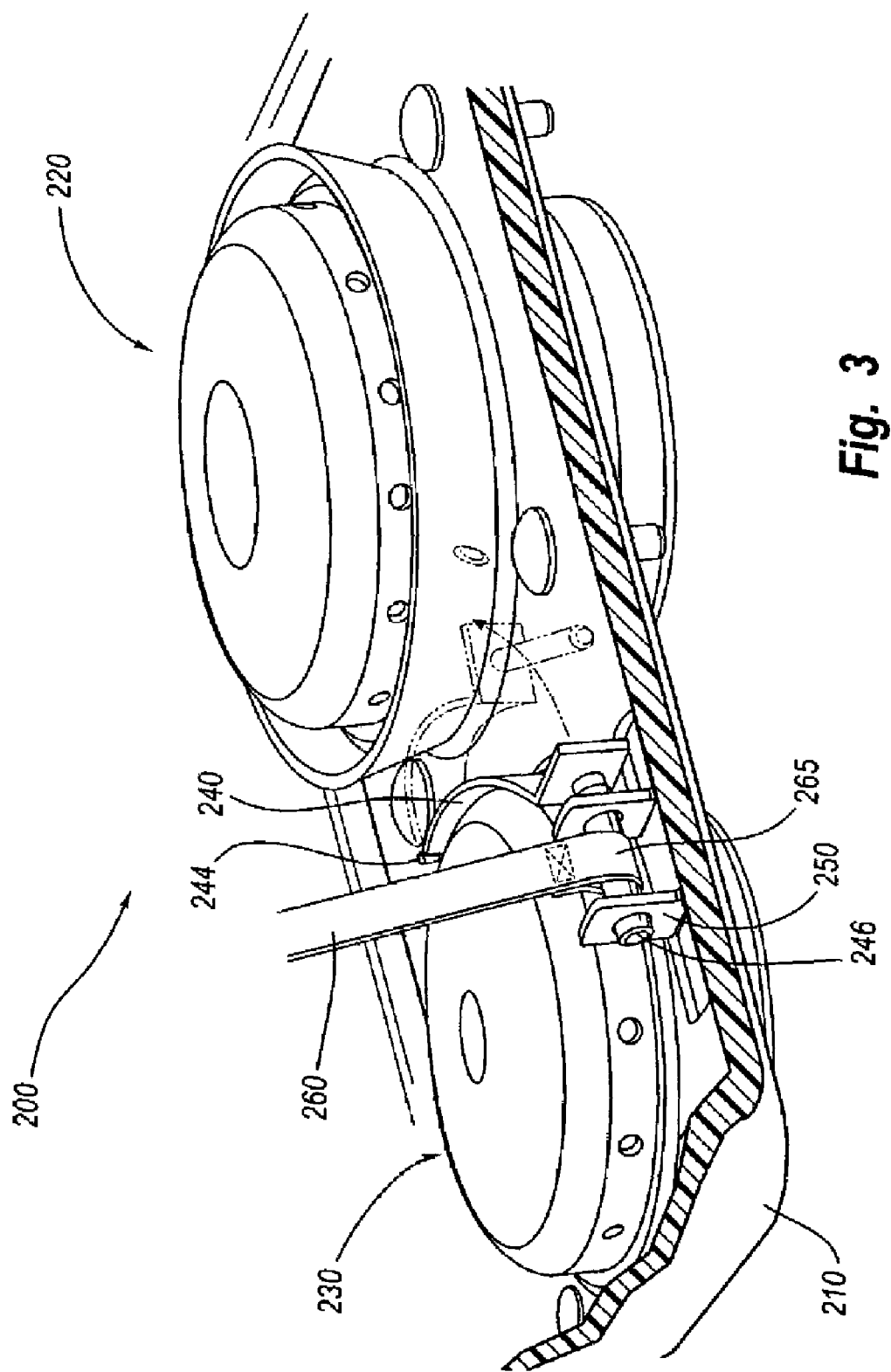

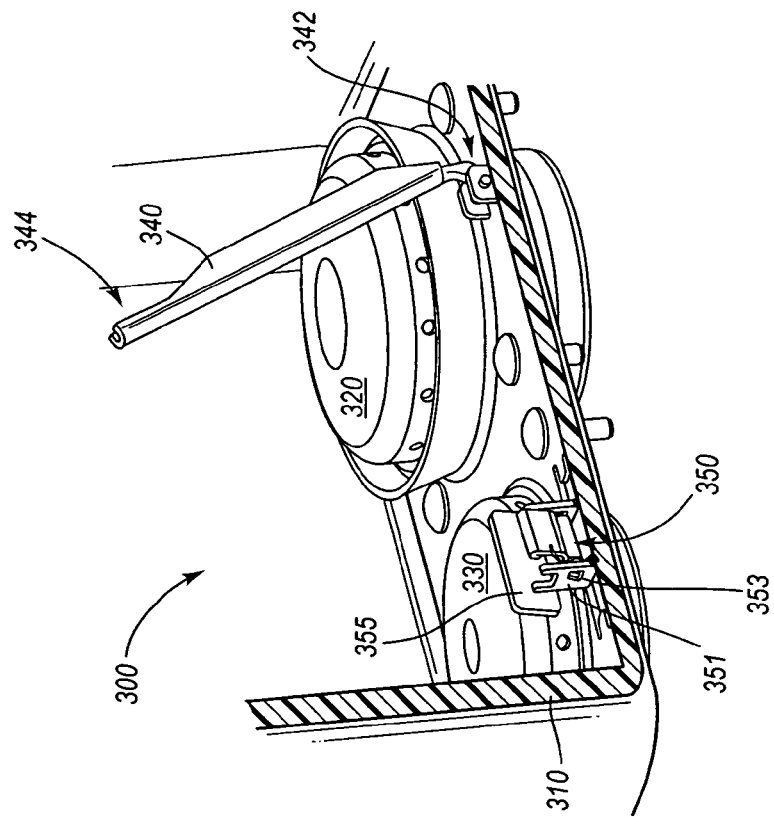
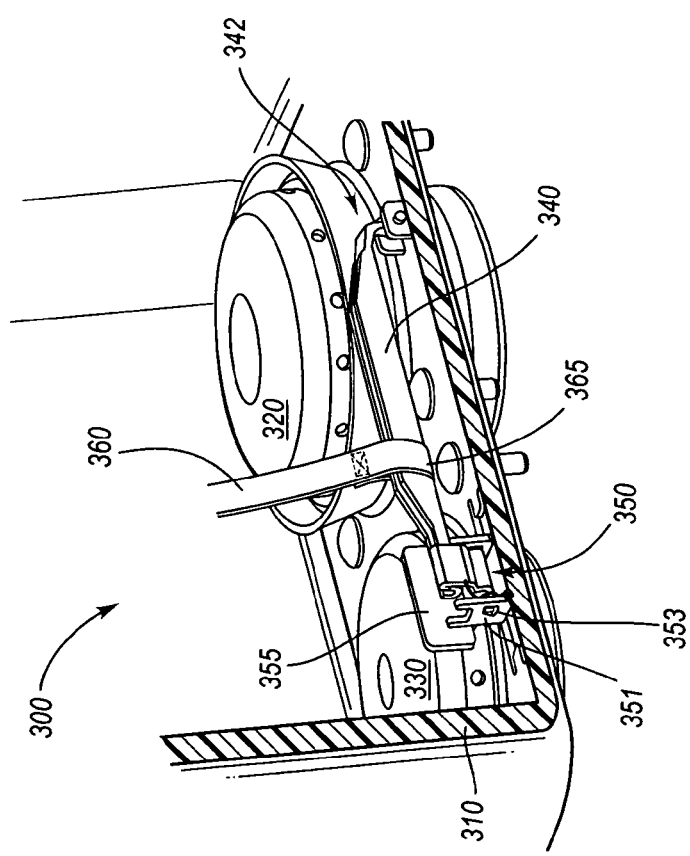
Fig. 5B
Fig. 5A

AIRBAG TETHER RELEASE

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1A is a side view of an embodiment of an airbag with an internal tether being inflated.

FIG. 1B is a side view of an airbag being inflated after the internal tether has been released.

FIG. 3 is a perspective view of another embodiment of an airbag inflation module.

FIG. 5A is a perspective view of the embodiment of FIG. 4 with the tether captured.

FIG. 5B is a perspective view of the embodiment of FIG. 5A with the tether released.

DETAILED DESCRIPTION OF PREFERRED EMBODIMENTS

Figure 2A:
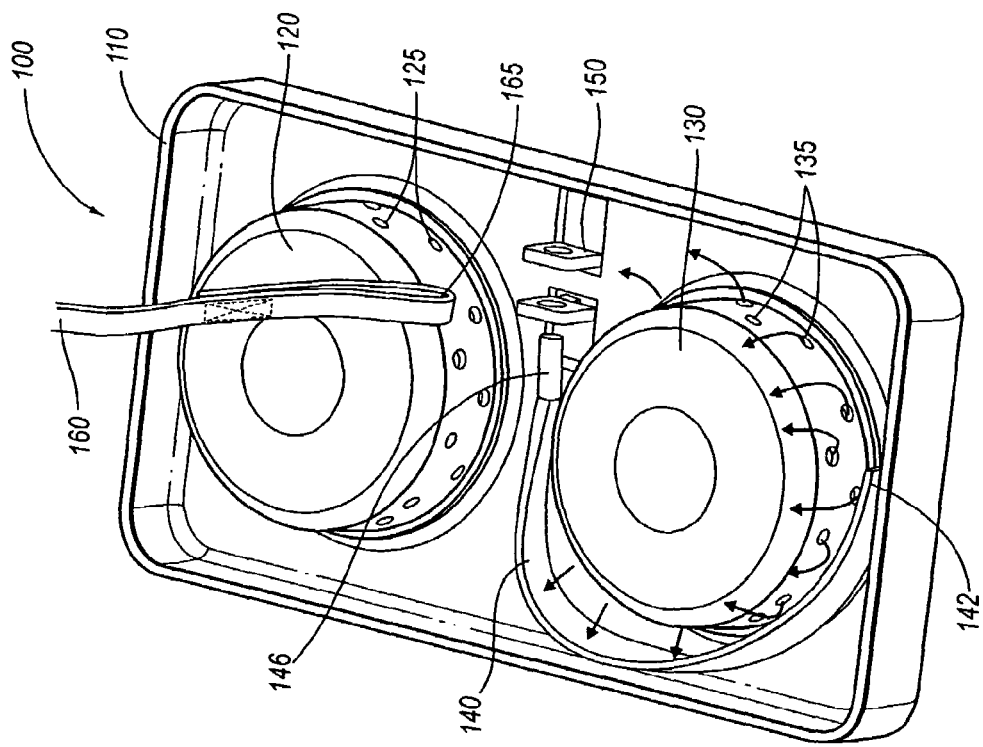
FIG. 2A is a perspective view of an embodiment of an airbag inflation module.

Described below are embodiments of methods and apparatus for inflating an airbag with a tether release system. In one embodiment of the invention, first and second inflators are connected with a module housing and positioned to inflate an inflatable cushion. The first and second inflators each have at least one exit gas port. A tether capture member is connected with the module housing and is adapted to hold a tether, which is connected with the inflatable cushion. The tether capture member is also adapted to release the tether upon deployment of one of the inflators, such that the exit gas flow from the inflator causes the release of the tether.

Thus, this embodiment allows for partial inflation of an airbag or full inflation of the airbag. Partial inflation of the airbag may be achieved by restricting the inflation size of the airbag with one or more tethers and by leaving undeployed the inflator operatively connected with the tether. Full inflation may be achieved by deployment of the inflator operatively connected with the tether such that the tether no longer restricts the inflation size of the airbag.

Of course, full deployment may be achieved by deploying all, or less than all, of the available inflators. Accordingly, in an embodiment with two inflators, full deployment may be achieved by deploying both inflators or, alternatively, by deploying only the inflator operatively connected with the tether. Likewise, partial deployment may be achieved by deploying any number of inflators up to one less than the total number of inflators available (the inflator operatively connected with the tether should not be deployed to achieve partial deployment, so as to leave the tether in a position in which it can restrict the inflation size of the airbag). For example, in an embodiment with two inflators, partial deployment would be achieved by deploying just one of the two inflators (the inflator not operatively connected with the tether).

Partial deployment of an airbag 10 with an internal tether 20 is shown in FIG. 1A. Tether 20 is shown in FIG. 1A restraining airbag 10 and restricting its inflation size. FIG. 1B depicts tether 20 after it has been released to allow airbag 10 to be fully inflated. As will become apparent, the depiction of FIG. 1B is achieved after deployment of an inflator (not shown) operatively connected with tether 20. In other words, deployment of one of the inflators allowed tether 20 to be released from one of its internal connections with airbag 10 and thereby allow airbag 10 to fully inflate.

One embodiment of the invention will now be described in greater detail with reference to FIGS. 2A-2B. These figures depict an inflation module 100. Inflation module 100 includes module housing 110, first inflator 120, and second inflator 130. First inflator 120 includes exit gas ports 125 and second inflator 130 includes exit gas ports 135. Module housing 110 is an example of means for housing an airbag inflation module. First inflator 120 and second inflator 130 are examples of inflation means for inflating an inflatable cushion. It should be understood that the terms "first" and "second" are used arbitrarily and for the sake of convenience in labeling only. These terms should not be interpreted so as to require or imply a particular sequence in the deployment of the inflators. First inflator 120 can be deployed before, simultaneously with, or after second inflator 130 depending upon, for example, the airbag system used, the circumstances and characteristics of the crash, and the desired shape and size of the airbag cushion.

A tether capture member 140 is attached to module housing 110 at end 142. Tether capture member 140 is adapted to have a first configuration wherein the tether capture member holds a tether and a second configuration wherein the tether is released from tether capture member 140. This allows an airbag system incorporating this embodiment of the invention to deploy variably, both with respect to the volume and/or shape of the airbag cushion. Maintaining the tether capture member in its first configuration allows the tether to restrain the size and/or shape of the airbag upon deployment, whereas reconfiguring the tether capture member such that it is in the second configuration allows the airbag cushion to fully inflate. Of course, more than one tether and/or more than one tether capture member may be used to customize deployment characteristics as desired for any number of applications.

Figure 2B:
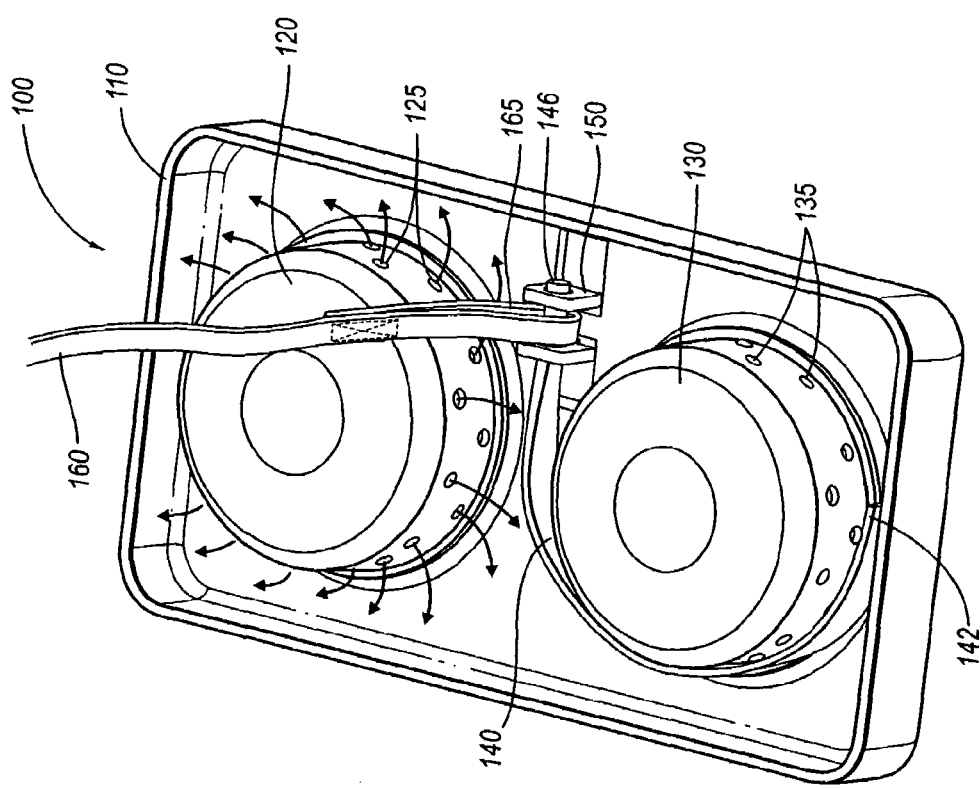
FIG. 2B is a perspective view of the embodiment depicted in FIG. 1 following deployment of the inflator operatively connected with the tether.

In the embodiment shown in FIGS. 2A-2B, tether capture member 140 comprises a band. In such embodiments in which the tether capture member comprises a band, the band may be metal, rubber, strapping, fabric, such as braided nylon, or any other structure or material available to one of skill in the art. At the end opposite from end 142, band 140 comprises a pin shown at 146. Pin 146 may be attached to band 140 or, alternatively, it may be integrally formed at the end of band 140. Likewise, pin 146 may be comprised of the same material as tether capture member 140 or of a different material.

As can be seen in the figures, band 140 is flexible, which allows it to be wrapped around second inflator 130. Band 140 also covers one or more of the exit gas ports 135. Pin 146 is inserted into a capture component 150. Capture component 150 releasably holds tether capture member 140 in place. Capture component 150 in the accompanying figures is integrally formed as part of module housing 110.

However, capture component 150 may instead be formed separately and attached or otherwise connected with the module.

Tether capture member or band 140 is adapted to hold a tether 160 connected with an inflatable cushion (not shown), as can be seen from the figures. Tether 160 is an example of means for restraining the inflation size of an inflatable cushion. Band 140 is an example of means for holding the restraining means in a position in which it restricts the inflation size of an inflatable cushion. Tether 160 is looped at one end and tether loop 165 is connected with pin 146, which is held by capture component 150.

Tether capture member or band 140 is adapted to release tether 160 upon deployment of second inflator 130. Specifically, the inflation module is configured such that the exit gas flow from second inflator 130 causes the release of tether 160. Thus, pin 146 fits within capture component 150 in the first configuration of tether capture member 140 and is removed from capture component 150 in the second configuration of tether capture member 140.

Upon deployment of second inflator 130, exit gas flow from one or more exit gas ports 135 forces band 140 away from second inflator 130, thereby pulling pin 146 out of capture component 150. Once pin 146 has been pulled from capture component 150, tether loop 165 is no longer looped around pin 146 and tether 160 no longer restricts the inflation size of the airbag cushion (not shown), as depicted in FIG. 2B. In other words, tether capture member 140 is positioned adjacent to one or more exit gas ports 135 of second inflator 130 in its first configuration such that the force of the exit gas flow upon deployment of second inflator 130 pushes tether capture member 140 away from the exit gas port(s) 135 and into its second configuration. Thus, the force of the exit gas flow of second inflator 130 causes pin 146 to be pulled from capture component 150, thereby releasing tether 160 from tether capture member 140.

Another embodiment of the invention is shown in FIG. 3. FIG. 3 depicts an inflation module 200 including first inflator 220 and second inflator 230, both of which are positioned in module housing 210. Inflation module 200 includes a tether capture member 240. Tether capture member 240 is rigid and includes hinged region 244. Opposite from hinged region 244 is a pin 246, which is configured to fit within capture member 250. Tether 260 is looped around pin 246 at tether loop 265.

Upon deployment of second inflator 230, inflation gas causes tether capture member 240 to pivot at hinged region 244 and pull pin 246 from capture member 250, thereby releasing tether 260 and allowing the airbag (not shown) to fully inflate. Tether capture member 240 is shown pivoted away from second inflator 230 in phantom in FIG. 3.

Figure 4:
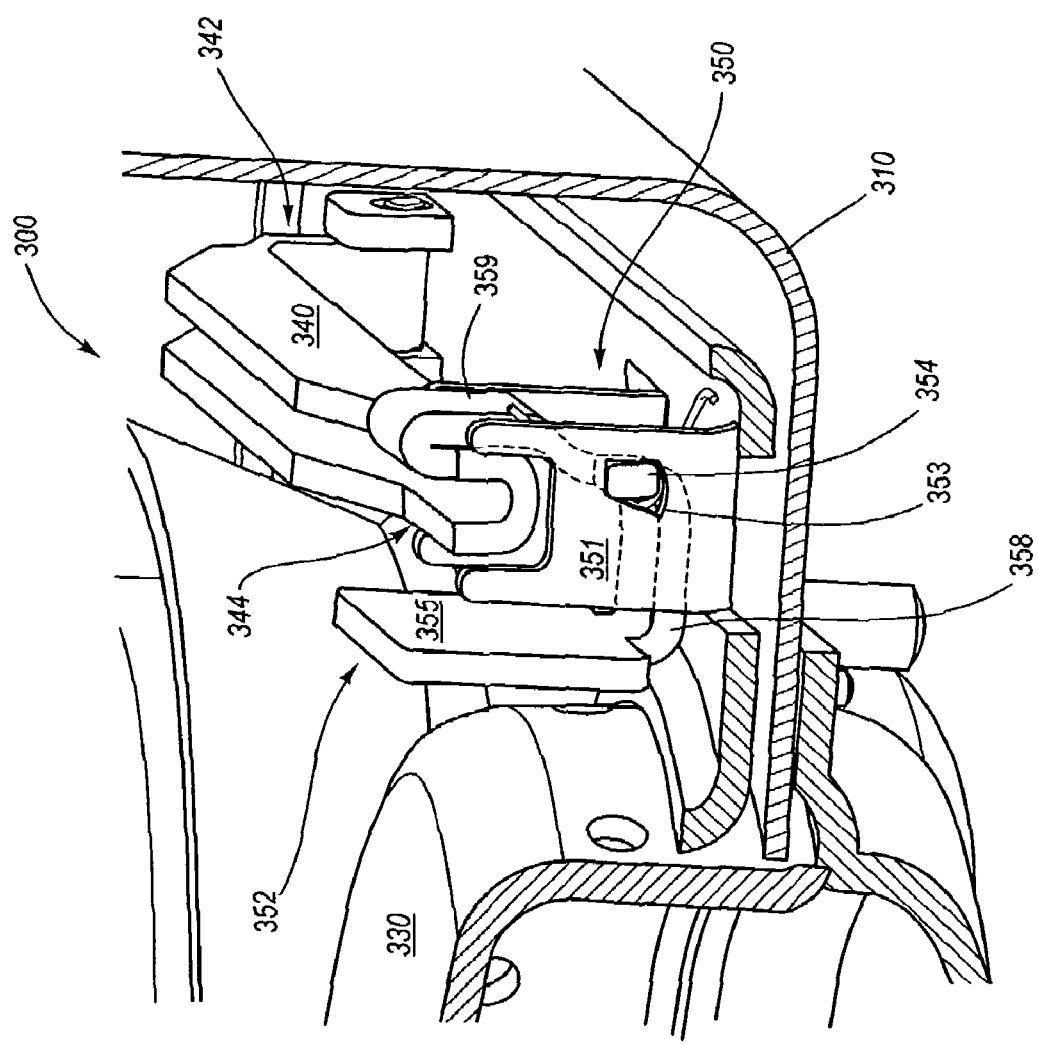
FIG. 4 is a perspective view of a portion of still another embodiment of an airbag inflation module.

Still another embodiment is shown in FIGS. 4 and 5A-5B. In these figures, an inflation module 300 is depicted. Inflation module 300 includes housing 310, which holds first inflator 320 and second inflator 330. Tether capture member 340 in this embodiment comprises a rod. Rod 340 may be pivotally coupled at a first end 342 to a bracket attached to housing 310. Rod 340 may be configured to pivot vertically, as shown, or in any other manner, such as horizontally.

A capture component 350, which is connected with housing 310, includes a capture base 351 and a capture rocker 352. Capture base 351 may include a pair of opposing apertures 353, which are adapted to receive a pair of opposing flanges 354, one of which may be seen in FIG. 4. Flanges 354 extend from capture rocker 352. Apertures 353 are adapted to allow flanges 354 to pivot therein, such that capture rocker 352 can pivot about flanges 354. Capture rocker 352 also includes a plate member 355. Plate member 355 is disposed adjacent to inflator 330 and is connected with arm 358, as shown in FIG. 4. Arm 358, which extends from plate member 355, extends to a clip member 359.

The second end 344 of rod 340 may rest on or partially nest within capture base 351. Clip member 359 engages second end 344 of rod 340 and retains rod 340 in a fixed position for tether retention. As shown in FIGS. 5A-5B, tether 360 is held by tether capture member 340 at tether loop 365. Capture component 350 secures rod 340 in a fixed position and retains tether 360.

Plate member 355 is configured to receive the impact of the exhaust gas from inflator 330. Once inflator 330 has been deployed, the force of the inflation gas against plate member 355 causes capture rocker 352 to rock or pivot sufficient to disengage clip member 359 from its position of retention against rod 340. Rod 340 is thereby disengaged at its second end 344 and pivots freely about its first end 342, as shown in FIG. 5B. As the airbag cushion expands, tether 360 is tightened and is readily pulled off of rod 340. The airbag cushion is then able to expand to its full capacity.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag inflation module, comprising:
    a module housing;
    a first inflator connected with the module housing, wherein the first inflator has at least one exit gas port formed therein;
    a second inflator connected with the module housing, wherein the second inflator has at least one exit gas port formed therein; and
    a tether capture member comprising a band connected with the module housing, wherein the tether capture member is adapted to hold a tether connected with an inflatable cushion and release the tether upon deployment of the second inflator, and wherein the inflation module is configured such that the exit gas flow from the second inflator causes the release of the tether.

2. The airbag system of claim 1, wherein the band is configured to pivot about an axis to result in the release of the tether.

3. The airbag system of claim 1, wherein the band is flexible.

4. The airbag system of claim 1, wherein the band is positioned and adapted to be at least partially wrapped around the second inflator.

5. The airbag system of claim 1, wherein the tether capture member further comprises a pin connected with the band.

6. The airbag system of claim 5, wherein the pin is integrally formed at one end of the band.

7. The airbag system of claim 1, wherein the tether capture member is adapted to have a first configuration and a second configuration, wherein in the first configuration the tether capture member holds the tether and in the second configuration the tether is released from the tether capture member.

8. The airbag system of claim 7, wherein the tether capture member is positioned adjacent to the exit gas port of the second inflator in the first configuration such that the force of the exit gas flow upon deployment of the second inflator pushes the tether capture member away from the exit gas port and into the second configuration.

9. The airbag system of claim 1, further comprising a capture component connected with the module housing, wherein the capture component is adapted to releasably hold the tether capture member.

10. The airbag system of claim 9, wherein the capture component is integrally formed with the module housing.

11. The airbag system of claim 9, wherein the tether capture member comprises a pin connected with the band, and wherein the pin fits within the capture component.

12. The airbag system of claim 11, wherein the tether capture member is adapted to have a first configuration and a second configuration, wherein in the first configuration the tether capture member holds the tether and in the second configuration the tether is released from the tether capture member, and wherein the pin fits within the capture component in the first configuration and is removed from the capture component in the second configurations.

13. An airbag system, comprising:
an inflatable cushion;
a module housing;
a first inflator connected with the module housing and positioned to inflate the inflatable cushion, wherein the first inflator has at least one exit gas port formed therein;
a second inflator connected with the module housing and positioned to inflate the inflatable cushion, wherein the second inflator has at least one exit gas port formed therein;
a tether connected with the inflatable cushion;
a capture component connected with the module housing; and
a tether capture member connected with the module housing and comprising a band connected with a pin at one end, wherein the tether capture member is adapted to have a first configuration and a second configuration, wherein in the first configuration the tether capture member holds the tether and in the second configuration the tether is released from the tether capture member, wherein the capture component is adapted to releasably hold the tether capture member, and wherein the tether capture member is positioned adjacent to the exit gas port of the second inflator in the first configuration such that the force of the exit gas flow upon deployment of the second inflator pushes the tether capture member away from the exit gas port and into the second configuration.

14. An airbag system, comprising:
an inflatable cushion;
means for housing an airbag inflation module;
first inflation means for inflating an inflatable cushion, wherein the first inflation means is connected with the means for housing an airbag inflation module, and wherein the first inflation means has at least one exit gas port formed therein;
second inflation means for inflating an inflatable cushion, wherein the second inflation means is connected with the means for housing an airbag inflation module, and wherein the second inflation means has at least one exit gas port formed therein;
means for restraining the inflation size of the inflatable cushion, wherein the restraining means is connected with the inflatable cushion; and
pivoting means for holding the restraining means in a position in which it restricts the inflation size of the inflatable cushion, wherein the holding means is adapted to release the restraining means upon deployment of the second inflation means, and wherein the system is configured such that the exit gas flow from the second inflation means causes the release of the restraining means.

15. A method for inflating an inflatable cushion, comprising:
deploying a first inflator into an inflatable cushion, wherein a tether is connected with the inflatable cushion;
holding the tether such that the tether is configured to restrict the inflation size of the inflatable cushion;
deploying a second inflator into the inflatable cushion; and
releasing the tether by pivoting at least a portion of a tether capture member about an axis such that the tether is no longer configured to restrict the inflation size of the inflatable cushion, wherein the step of releasing the tether is performed by the exit gas flow of the second inflator.

16. The method of claim 15, wherein the tether is initially held in place to restrict the inflation size of the inflatable cushion with a tether capture member.

17. The method of claim 16, wherein the tether capture member is adapted to have a first configuration and a second configuration, wherein in the first configuration the tether capture member holds the tether and in the second configuration the tether is released from the tether capture member.

18. The method of claim 17, wherein the tether capture member is positioned adjacent to an exit gas port of the second inflator in the first configuration such that the force of the exit gas flow upon deployment of the second inflator pushes the tether capture member away from the exit gas port and into the second configuration.

19. The method of claim 16, wherein a capture component releasably holds the tether capture member in place.

20. The method of claim 19, wherein the tether capture member comprises a pin positioned at one end of the tether capture member, wherein the pin fits within the capture component, and wherein the force of the exit gas flow of the second inflator causes the pin to be pulled from the capture component.

* * * * *